United States Patent [19]
Chow

[11] 4,176,386
[45] Nov. 27, 1979

[54] OVERCURRENT RELAY
[75] Inventor: Kung C. Chow, East Hanover, N.J.
[73] Assignee: Westinghouse Electric Corp., Pittsburgh, Pa.
[21] Appl. No.: 907,522
[22] Filed: May 19, 1978
[51] Int. Cl.² ............................................. H02H 3/08
[52] U.S. Cl. ..................................... 361/93; 307/358; 324/127; 361/98
[58] Field of Search ..................... 361/93, 94, 98, 187; 323/6, 8; 324/102, 127; 307/358

[56] References Cited
U.S. PATENT DOCUMENTS

| 3,333,155 | 7/1967 | Steen | 361/98 |
| 3,685,035 | 8/1972 | McClain et al. | 361/93 X |
| 3,956,670 | 5/1976 | Shimp et al. | 361/98 |
| 4,093,977 | 6/1978 | Wilson | 361/98 X |

FOREIGN PATENT DOCUMENTS 1961686  6/1971  Fed. Rep. of Germany.

Primary Examiner—Harry E. Moose, Jr.
Attorney, Agent, or Firm—D. R. Lackey

[57] ABSTRACT

A solid state overcurrent relay which receives both an information signal and operating power from a single current transformer. A power supply, which couples the current transformer and relay, is constructed to present a constant impedance load on the current transformer, enabling the current transformer to simultaneously provide an accurate information signal.

9 Claims, 1 Drawing Figure

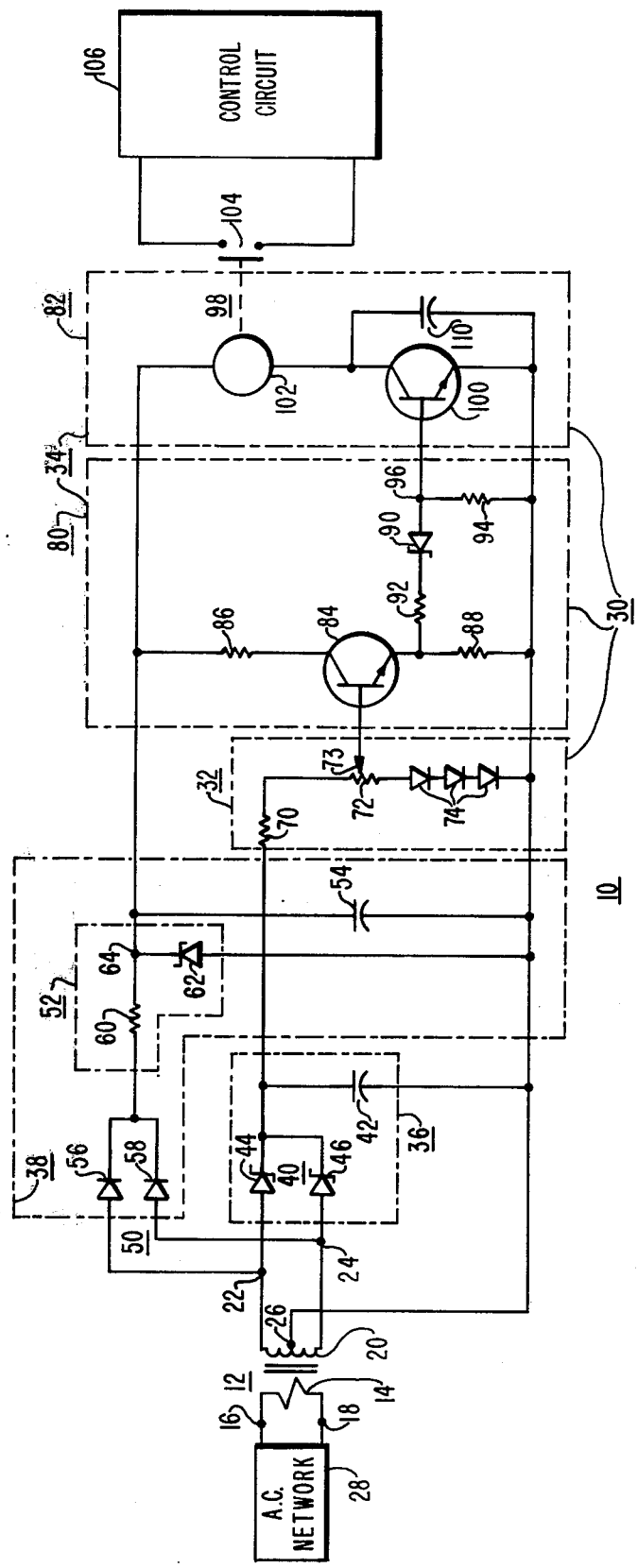

OVERCURRENT RELAY

BACKGROUND OF THE INVENTION

1. Field of the Invention

The invention relates in general to protective relays, and more specifically to protective relays of the solid state, overcurrent type.

2. Description of the Prior Art

Overcurrent relays constructed of solid state components require efficient and economical means for providing both an information signal and operating power. A saturable current transformer may be used, with both the current information and circuit power being supplied by this saturable current transformer. The line current information is interpreted from the current transformer's secondary voltage peaks. However, the relationship between the actual line current and these voltage peaks is unique and consistent only when the waveshape and frequency of the line current are defined. If the design is based upon a nominally 60 Hz sinusoidal line current status, the saturated secondary voltage peaks representing the line current value may suffer inaccuracies or become meaningless when the line current contains excessive harmonic and D.C. components. Of course, a linear current transformer may be used for current measurement, and the circuit operating power may be provided either externally or by an auxiliary saturable current transformer. Obtaining power by these methods, however, will complicate the overall relay circuit design and increase its cost.

Co-pending application Ser. No. 648,689, filed Jan. 13, 1976, which is a continuation of application Ser. No. 527,460, filed Nov. 26, 1974, now abandoned, both of which are assigned to the same assignee as the present application, discloses an arrangement which utilizes a linear current transformer having two secondary windings. A solid state switching circuit sequences the two secondary windings to replenish a power supply with the first secondary winding, and then to provide a current signal with the second secondary winding, both during a current half cycle. The primary ampere turns are substantially completely balanced by the second secondary winding when it is providing the information signal, to provide a highly accurate signal.

German Patent No. 1,961,686, dated June 9, 1971, discloses the use of one half wave of a three-phase full-wave bridge rectifier to provide an operating voltage, and the other half wave of the bridge rectifier for a current signal.

It would be desirable to be able to simultaneously provide an information signal and operating power from a single linear current transformer having a single secondary winding. However, it is also desirable that the information signal be highly accurate, tracking changes in the current being measured in a linear manner.

SUMMARY OF THE INVENTION

Briefly, the present invention is a new and improved overcurrent relay having a first portion which requires an information signal, and a second portion which requires a power supply. The relay utilizes a single, linear current transformer for simultaneously providing both the operating power and a highly accurate information signal. The current transformer includes a primary winding and a secondary winding. The power supply for the relay includes first rectifier means for rectifying the output of the secondary winding, a resistor, and a Zener diode. The resistor and Zener diode are serially connected across the output of the first rectifier means, with the second portion of the relay being connected across the Zener diode.

Second rectifier means rectifies the output of the secondary winding, to provide an information signal for the first portion of the protective relay.

The resistor and Zener diode are selected such that the minimum current flow through the Zener diode exceeds the maximum current requirement of the second portion of the relay. This arrangement provides a constant impedance load on the current transformer, with a change in the load presented by the relay merely resulting in a redistribution of the current between the Zener diode and relay. The total average current through the resistor remains constant. Thus, the second rectifier means provides a highly accurate information signal, unaffected by the varying current demand of the second portion of the relay.

BRIEF DESCRIPTION OF THE DRAWING

The invention may be better understood, and further advantages and uses thereof more readily apparent, when considered in view of the following detailed description of an exemplary embodiment, in which the single figure is a schematic diagram of an overcurrent relay constructed according to the teachings of the invention.

DESCRIPTION OF PREFERRED EMBODIMENT

Referring now to the single FIGURE, there is shown a schematic diagram of a solid state overcurrent relay 10 constructed according to the teachings of the invention. Overcurrent relay 10 includes a current transformer 12 having a primary winding 14 with input terminals 16 and 18 connected thereto, and a secondary winding 20 having output terminals 22 and 24. As will be hereinafter explained, secondary winding 20 is required to supply energy to two full-wave rectifiers. In a preferred embodiment of the invention the secondary winding includes a center-tap 26, as it requires two less diodes. However, it is to be understood that the invention applies equally to a current transformer having a non-tapped secondary winding. Current transformer 12 is a linear transformer, designed to be substantially non-saturating over a predetermined designed current range.

Primary winding 14 is adapted for energization by an alternating current flowing in an A.C. network 28 to be protected.

Relay 10 includes detector means 30 having a first portion 32 which requires an information signal, and a second portion 34 which requires a power supply. Secondary winding 20 of the linear current transformer 12 provides both the information signal and the power supply simultaneously, with first means 36 interconnecting the secondary winding 20 with the first portion 32, and second means 38 interconnecting the secondary winding 20 with the second portion 34.

The first interconnecting means 36 includes a full-wave rectifier 40 and a ripple filter which includes a capacitor 42. The full-wave rectifier 40 preferably includes first and second Zener diodes 44 and 46 having their anodes connected to output terminals 22 and 24, respectively, of the second winding 20, and their cathodes connected in common to one side of capacitor 42.

The other side of capacitor 42 is connected to the common return, which in the embodiment illustrated is the center-tap 26. With a non-tapped secondary, first and second additional diodes of the conventional type would have their cathodes connected to terminals 22 and 24, respectively, and their anodes would be connected together to form the common return. The voltage across capacitor 42 is the information signal for the first portion 32 of detector means 30. The Zener diodes 44 and 46, in addition to providing a D.C. signal responsive to the current magnitude flowing in the primary winding 14, additionally provide a desirable surge suppression function.

The second interconnecting means 38 includes a full-wave rectifier 50, means 52 for maintaining the linearity of current transformer 12 within the range of current being measured, and a ripple filter which includes a capacitor 54. Full-wave rectifier 50 includes first and second diodes 56 and 58 which have their anodes connected to output terminals 22 and 24, respectively, of secondary winding 20, and their cathodes connected in common to one side of means 52. The other side of means 52 is connected to the common return, i.e. to center-tap 26.

Means 52 for maintaining the linearity of current transformer 12 includes a resistor 60 and non-linear means 62, such as a Zener diode. Resistor 60 and Zener diode 62 are serially connected from the full-wave rectifier 50 to the center-tap 26, with one end of resistor 60 connected to the full-wave rectifier 50, and its other end connected to the cathode of Zener diode 62 at junction 64. The anode of Zener diode 62 is connected to the center-tap 26. Filter capacitor 54 is connected from junction 64 to the center-tap 26.

The second portion 34 of detector means 30 is connected from junction 64 to center-tap 26. Thus, means 52 and the second portion 34 are connected in parallel with respect to the full-wave rectifier 50. These two parallel connected branches collectively provide a constant load impedance on current transformer 12.

More specifically, resistor 60 and Zener diode 62 are selected to provide a current flow through Zener diode 62 which exceeds the maximum current required by the second portion 34 of relay 10. For example, if the second portion 34 requires a maximum current of 15 MA, resistor 60 and Zener diode 62 should be selected such that the current through the Zener diode is equal to at least 15 MA when the second portion 34 is not drawing current. Then, when portion 34 becomes operative and draws current, the amount of current drawn will reduce the current through Zener diode 62 by a like amount. Thus, changes in the load impedance of the second portion 34 merely result in a redistribution of the current between the Zener diode 62 and the second portion 34. The total current drawn by the two parallel branches is always constant.

According to the ampere turns balance principle between the primary and secondary windings of a current transformer, the variation of the secondary current is proportional to the variation of the primary current. Since the load impedance provided by the two parallel branches of full-wave rectifier 50 is constant, the current supplied by the full-wave rectifier 50 will be constant. Thus, any change in primary current will result in a proportional change in the secondary current, resulting in a voltage across capacitor 42 versus the primary current which is linear within the range of current to be measured.

The first portion 32 of detector means 30, which receives the current information signal developed across capacitor 42, includes level setting means, such as serially connected resistors 70 and 72. Resistor 72 is preferably an adjustable resistor, having an adjustable arm 73 for selecting the desired value of resistance to enable the overcurrent value which will actuate relay 10 to be adjustably selected. A plurality of serially connected diodes 74 may be connected in series with the resistors 70 and 72, in order to provide temperature compensation. The serially connected resistors 70 and 72 and the diode 74 are connected across capacitor 42.

The second portion 34 of detector means 30 includes level sensing means 80 and signal means 82. Level sensing means 80 includes an NPN junction transistor 84, connected in the emitter follower configuration. The base of transistor 84 is connected to arm 73 of adjustable resistor 72, its collector is connected to junction 64 of the power supply via a resistor 86, and its emitter is connected to center-tap 26 via a resistor 88. Level sensing means 84 additionally includes a Zener diode 90 and resistors 92 and 94. One end of resistor 92 is connected to the emitter of transistor 84, and its other end is connected to the cathode of Zener diode 90. Resistor 94 has one end connected to the anode of Zener diode 90 at junction 96, and its other end is connected to center-tap 26. When the voltage at arm 73 of adjustable resistor 72 reaches the voltage required to break down Zener diode 90, the Zener diode will conduct and provide a voltage across resistor 94, which voltage operates signal means 82.

Signal means 82 may include an electromagnetic relay 98, such as a telephone relay, and a solid state switch 100, such as an NPN junction transistor. Relay 98 includes an electromagnetic coil, shown generally at 102, and at least one contact 104 whose condition is responsive to whether or not coil 100 is energized. Contact 104 is connected in a control circuit 106, which may be the trip circuit of a circuit breaker connected in A.C. network 28, for example. A surge capacitor 110 is connected across the collector-emitter electrodes of transistor 100.

In the previous example wherein the maximum current required by the second portion 34 of detector means 30 was assumed to be 15 MA, resistor 60 and Zener diode 62 would be selected to draw at least 15 MA before transistor 84 turns on. When the primary current in primary winding 14 reaches a magnitude which provides sufficient base drive to turn transistor 84 on, the primary current magnitude will then be monitored by level sensing means 80. When the primary current reaches a magnitude which causes the voltage at arm 73 of adjustable resistor 72 to break down the Zener diode 90, Zener diode 90 will conduct and provide base drive for transistor 100. Transistor 100 will thus turn on to energize the coil 102 of the electromagnetic relay 98, and the state of the contact 104 will be changed. For example, if contact 104 is normally open, it will be closed, and if it is normally closed, it will be opened when relay 98 is energized.

In summary, there has been disclosed a new and improved solid state overcurrent relay which utilizes a single linear current transformer to provide relay operating power, and a highly accurate current information signal. The resistor-Zener diode combination 52 assures the linearity of the current information signal within the range of current to be measured, while providing an economical but effective power supply for almost any solid state overcurrent relay, regardless of whether the current information is processed in RMS, peak, or average form.

I claim as my invention:

1. An overcurrent relay, comprising:
   a current transformer having a primary winding adapted for energization by an alternating current, and a secondary winding,
   detector means including a first portion which requires an information signal, and a second portion which requires a power supply,
   first means connecting said secondary winding to the first portion of said detector means, to provide said information signal,
   and second means connecting said secondary winding to the second portion of said detector means, to provide said power supply,
   said second means including non-linear means which, along with the second portion of said detector means, co-operate to provide a constant impedance load on said current transformer, to enable said current transformer to simultaneously supply operating power, and an information signal which varies linearly with the alternating current flowing in said primary winding.

2. The overcurrent relay of claim 1 wherein the first and second means includes first and second full-wave rectifier means each connected to said secondary winding.

3. The overcurrent relay of claim 2 wherein the first rectifier means includes Zener diodes connected to rectify the output of the secondary winding, and provide surge protection for the first portion of the detector means.

4. The overcurrent relay of claim 2 wherein the non-linear means includes a resistor and a Zener diode connected to the second rectifier means, with said Zener diode and resistor being selected to provide a minimum current flow through said Zener diode which exceeds the maximum current demand of the second portion of said detector means.

5. The overcurrent relay of claim 1 wherein the first portion of the detector means includes level setting means, and the second portion includes level sensing means responsive to said level setting means, and signal means responsive to said level sensing means, said signal means including a switchable device which is switchable between first and second operating states in response to said level sensing means.

6. The overcurrent relay of claim 5 wherein the first means includes rectifier means, and ripple filter means connected to said rectifier means having a capacitive element, with the level setting means including adjustable resistance means connected across said capacitive element.

7. The overcurrent relay of claim 6 wherein the level sensing means includes a junction transistor connected as an emitter follower, and a Zener diode connected between the emitter of said transistor and the signal means.

8. The overcurrent relay of claim 7 wherein the signal means includes an electromagnetic relay and a solid state switch having a control electrode connected to the Zener diode.

9. The overcurrent relay of claim 2 wherein the non-linear means includes a resistor and Zener diode serially connected across the output of the second rectifier means, with the second portion of the detector means being connected across said Zener diode.

* * * * *